United States Patent
Barbulescu et al.

(10) Patent No.: US 9,432,516 B1
(45) Date of Patent: Aug. 30, 2016

(54) SYSTEM AND METHOD FOR COMMUNICATING STREAMING AUDIO TO A TELEPHONE DEVICE

(75) Inventors: Marcel Barbulescu, Falls Church, VA (US); Elan Joel Blutinger, Washington, DC (US); Joseph Bous, Washington, DC (US); Thomas M. Isaacson, Huntingtown, MD (US)

(73) Assignee: Alpine Audio Now, LLC, Reston, VA (US)

( * ) Notice: Subject to any disclaimer, the term of this patent is extended or adjusted under 35 U.S.C. 154(b) by 567 days.

(21) Appl. No.: 12/716,623

(22) Filed: Mar. 3, 2010

Related U.S. Application Data

(60) Provisional application No. 61/157,036, filed on Mar. 3, 2009.

(51) Int. Cl.
*H04M 3/56* (2006.01)

(52) U.S. Cl.
CPC ..................... *H04M 3/56* (2013.01)

(58) Field of Classification Search
CPC ..................................... H04M 3/56
USPC ............ 379/92.03, 88.17, 202.01–206.01, 379/88.13, 93.21, 158; 709/205, 248; 725/61; 455/41.2; 702/182
See application file for complete search history.

(56) References Cited

U.S. PATENT DOCUMENTS

| | | |
|---|---|---|
| 5,444,768 A | 8/1995 | Lemaire et al. |
| 5,490,207 A * | 2/1996 | Schorr ................. 379/92.03 |
| 5,608,786 A | 3/1997 | Gordon |
| 6,018,710 A | 1/2000 | Wynblatt et al. |
| 6,175,562 B1 | 1/2001 | Cave |
| 6,233,318 B1 | 5/2001 | Picard et al. |
| 6,473,609 B1 | 10/2002 | Schwartz et al. |
| 6,546,421 B1 | 4/2003 | Wynblatt et al. |
| 6,628,300 B2 | 9/2003 | Amini et al. |
| 6,678,215 B1 | 1/2004 | Treyz et al. |
| 6,687,341 B1 | 2/2004 | Koch et al. |
| 6,721,403 B1 | 4/2004 | Mandalia |
| 6,728,731 B2 | 4/2004 | Sarukkai et al. |
| 6,738,620 B2 | 5/2004 | Siemens |

(Continued)

FOREIGN PATENT DOCUMENTS

WO    WO 98/47252    10/1998

OTHER PUBLICATIONS

"Sontora offers audio-streaming beta-trials for WAP content providers", Business Wire, May 31, 2000.

(Continued)

*Primary Examiner* — Md S Elahee

(57) ABSTRACT

Disclosed herein are a computer-implemented method, system and tangible non-transitory computer-readable storage media for communicating information between a radio host and a calling device. The method includes receiving a request from a group of devices for live streaming audio from a website, connecting the group of devices to the website in response to the received request, streaming audio from website to the group of devices, receiving input during the live streaming audio from at least one of the group of devices, aggregating the input from the at least one of the group of devices, and presenting the aggregated input to the radio host, wherein the radio host can respond in the live streaming audio to the presented aggregated input. Users can queue a personal playlist and share playlists of audio generated from web-based articles for telephonic playback.

10 Claims, 12 Drawing Sheets

(56) References Cited

U.S. PATENT DOCUMENTS

| | | | |
|---|---|---|---|
| 6,775,539 B2 | 8/2004 | Deshpande | |
| 6,970,915 B1 | 11/2005 | Partovi et al. | |
| 7,068,641 B1 | 6/2006 | Allan et al. | |
| 7,298,830 B2 | 11/2007 | Guedalia et al. | |
| 7,673,317 B1* | 3/2010 | Shusman | 725/61 |
| 7,996,566 B1* | 8/2011 | Sylvain | H04N 7/15 709/248 |
| 2002/0032564 A1 | 3/2002 | Ehsani et al. | |
| 2002/0062246 A1 | 5/2002 | Matsubara | |
| 2002/0112004 A1* | 8/2002 | Reid et al. | 709/205 |
| 2003/0002635 A1 | 1/2003 | Koch et al. | |
| 2003/0028518 A1 | 2/2003 | Mankoff | |
| 2003/0091176 A1 | 5/2003 | Feldes et al. | |
| 2003/0103607 A1 | 6/2003 | Feakes | |
| 2005/0154557 A1* | 7/2005 | Ebert | 702/182 |
| 2007/0288978 A1 | 12/2007 | Pizzurro et al. | |
| 2008/0033832 A1 | 2/2008 | Ho | |
| 2008/0052169 A1 | 2/2008 | O'Shea et al. | |
| 2008/0097844 A1 | 4/2008 | Hsu et al. | |
| 2008/0097851 A1 | 4/2008 | Bemmel et al. | |
| 2008/0262928 A1 | 10/2008 | Michaelis | |
| 2008/0282293 A1 | 11/2008 | Frechter et al. | |
| 2008/0294998 A1 | 11/2008 | Pyhalammi et al. | |
| 2008/0306826 A1 | 12/2008 | Kramer et al. | |
| 2008/0320082 A1* | 12/2008 | Kuhlke et al. | 709/205 |
| 2009/0083778 A1 | 3/2009 | Berstis | |
| 2009/0264070 A1* | 10/2009 | Lim | 455/41.2 |
| 2009/0287840 A1* | 11/2009 | Gadoury et al. | 709/231 |
| 2010/0106508 A1* | 4/2010 | Malesky, II | 704/500 |

OTHER PUBLICATIONS

"On-Demand CD Quality Audio Streaming Now Available on the Web With Streaming 21's New MP3 Server", PR Newswire, Jun. 27, 2000—4 pages.

Mori et al. "A Real-Time IMT-2000 Audio Transmission System", IEEE Transactions on Consumer Electronics, vol. 47, No. 4, Nov. 2001.

Mao et al. "Achieving Service Portability Using Self-Adaptive Data Paths," IEEE Communications Magazine, vol. 40, No. 1, pp. 108-114, Jan. 2002.

Alexander, Steve "Mainstreaming: More people are getting video and music via cell phone (Business)", Star Tribune (Minneapolis, MN), Jan. 8, 2004.

Hughlett, Mike "Hold the phone no more? Motorola iTunes line may finally be shown," Chicago Tribune (Chicago, IL), Jul. 25, 2005.

Gibbs, Colin "Music: Place-Shifting's Next Frontier (News)," RCR Wireless News, Mar. 12, 2007.

* cited by examiner

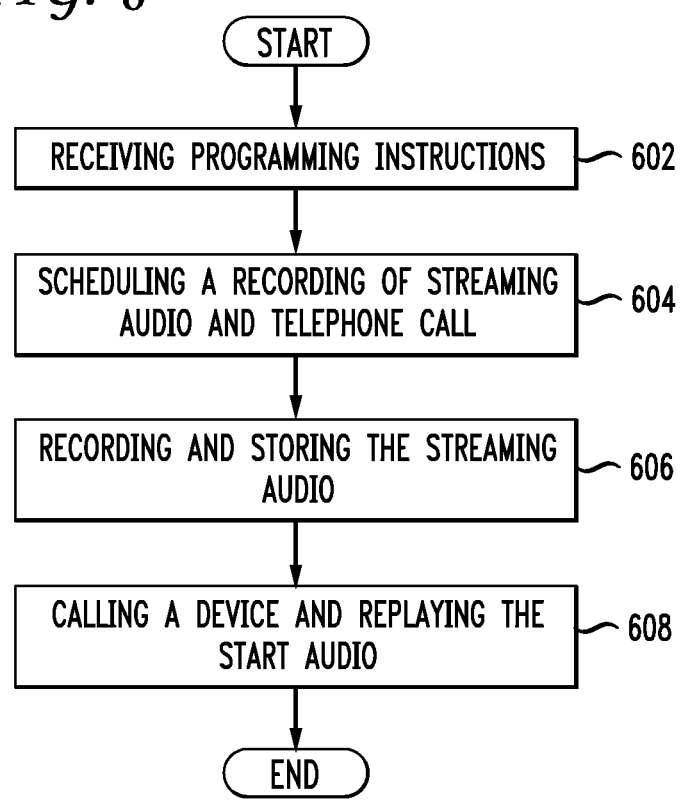

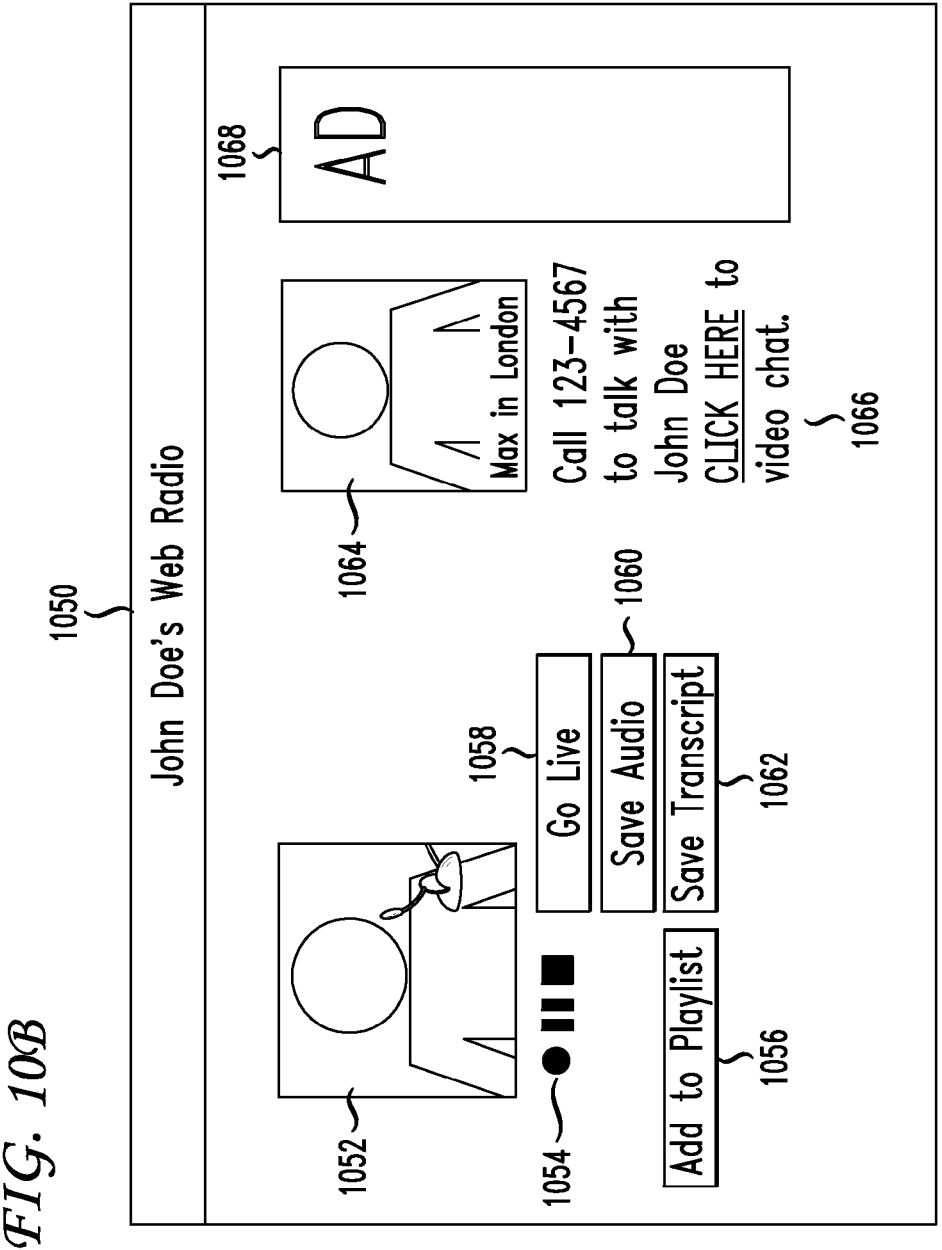

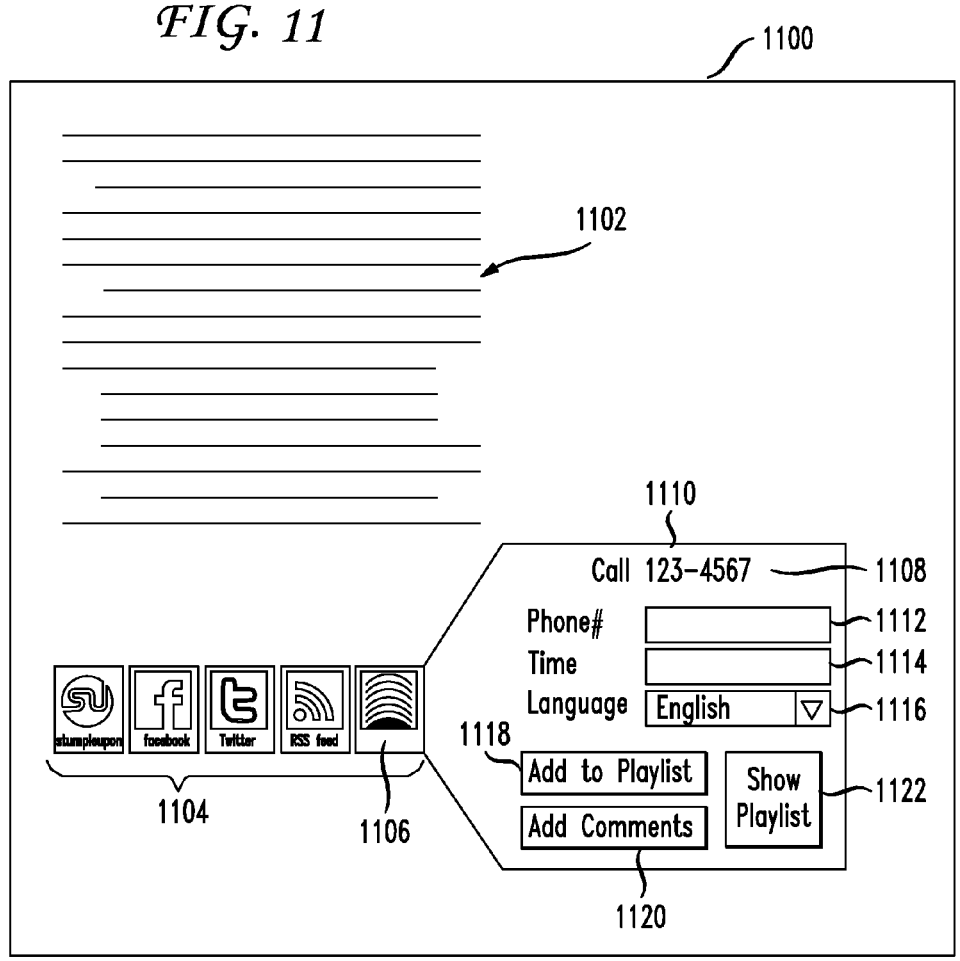

SYSTEM AND METHOD FOR COMMUNICATING STREAMING AUDIO TO A TELEPHONE DEVICE

This application claims priority to U.S. Provisional Patent Application No. 61/157,036 filed on 3 Mar. 2009, which is herein incorporated by reference in its entirety.

BACKGROUND

1. Technical Field

The present disclosure relates to streaming audio and more specifically to systems and methods of connecting audio streaming from a website to a telephone or other device that communicates via a telephone, cellular or voice-over IP connection and the like.

2. Introduction

Basic mechanisms are known for providing telephone access to audio programming. However, there are a number of deficiencies in the art with regards to the ability of a user to identify desired audio and easily and in a simple manner receive over a telephone or mobile device the desired programming. Currently, there is also a political debate over the so-called "fairness doctrine" that illustrates a desire and need for people to be able to obtain news and commentary easily, including opinions on both sides of the political spectrum. Accordingly, what is needed in the art are improved systems and methods in the overall context of delivering audio programming to a telephone or other device.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed is a computer-implemented method, system, and tangible non-transitory computer-readable storage media for communicating information between a radio host and a calling device. The method includes receiving a request from a group of devices for live streaming audio from a website, in response to the received request, connecting the group of devices to the website, streaming audio from website to the group of devices, receiving input during the live streaming audio from at least one of the group of devices, aggregating the input from the at least one of the group of devices and presenting the aggregated input to the radio host, wherein the radio host can respond in the live streaming audio to the presented aggregated input.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles will be described and explained with additional specificity and detail through the use of the accompanying drawings in which:

FIG. 6 illustrates a method embodiment;

FIG. 10B illustrates an example listener interface for participating in a personal radio broadcast;

FIG. 11 illustrates an example web interface for adding text to an audio playlist;

FIG. 12 illustrates an example interface for managing an audio playlist; and

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
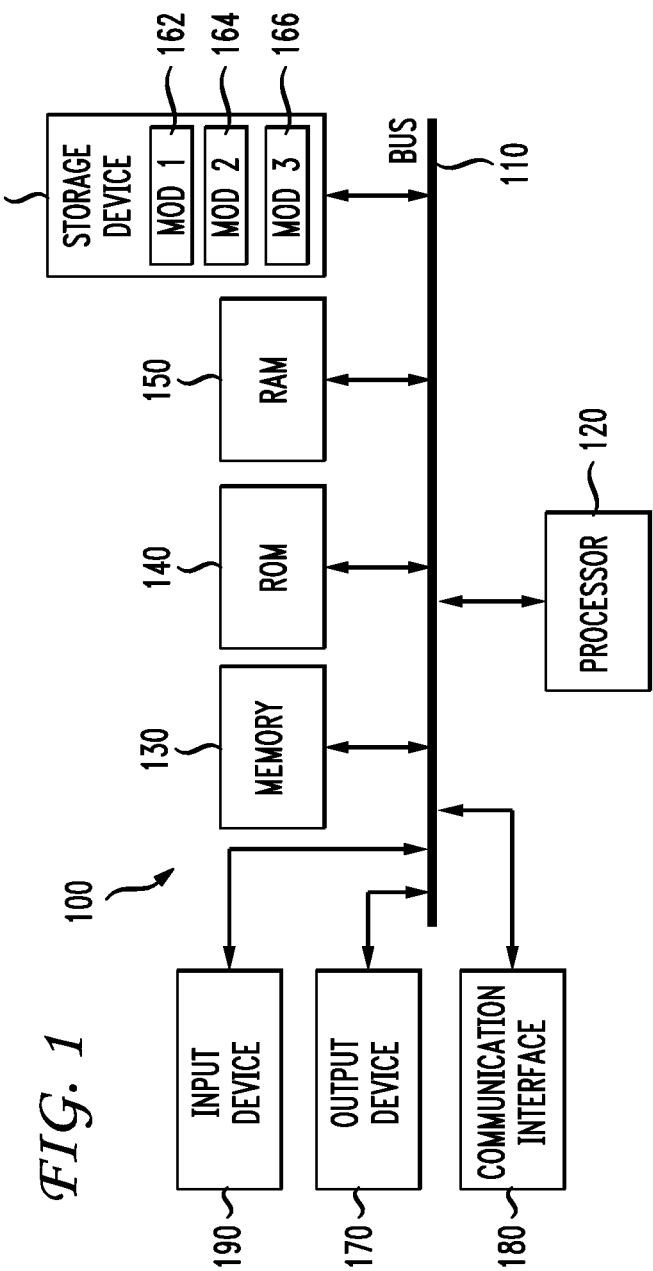
FIG. 1 illustrates a basic system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. These and other modules can be configured to control the processor 120 to perform various actions. Other system memory 130 may be available for use as well. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a tangible and/or intangible computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. The input device 190 may be used by the presenter to indicate the beginning of a speech search query. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Generally speaking, such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
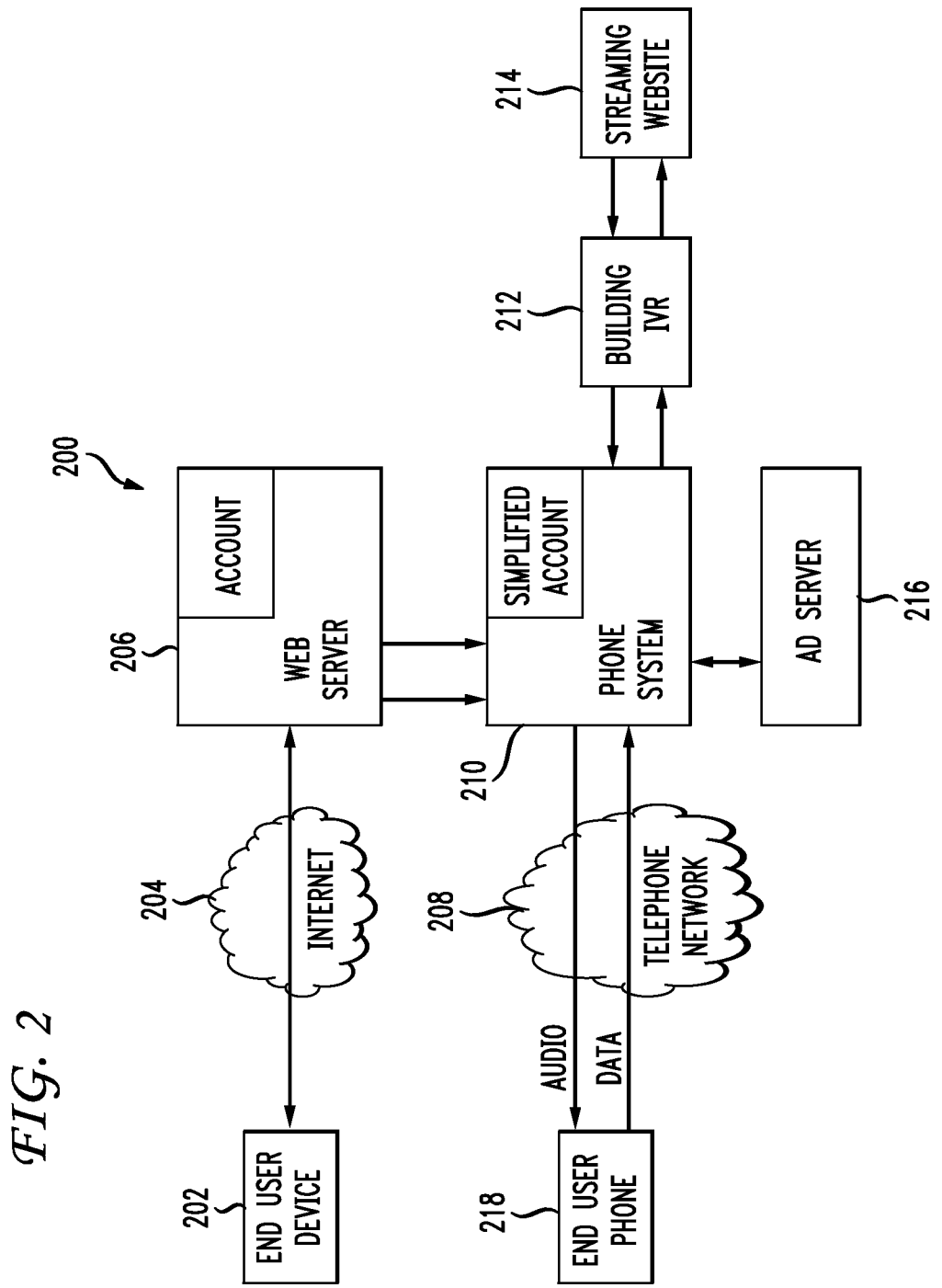
FIG. 2 illustrates a general configuration of a more detailed system embodiment.

Having disclosed some basic system components, the disclosure now turns to the exemplary embodiment 200 for communicating information between a radio host and a calling device, as shown in FIG. 2. This embodiment illustrates a system and methods by which a user can register with an audio delivery system over the Internet and thereafter, once an account is created, telephone a phone system and request desired streaming audio. The user can also initially call into the system and register over the phone. For example, the user can identify that they need to set up an account during their initial interaction with the system. Through an interactive dialog, the user can then provide the necessary information such as the phone number they desire to register, email address, etc.

User device 202 typically includes a computer or web browser on any kind of end user device that communicates via the Internet 204 or other network with the web server 206. The user creates an account which requests basic required information to enable the user to call in and receive streaming audio. The basic account information is preferably a telephone number and a password or a PIN. The password can be a series of characters, a spoken phrase, or an answer to a challenge question. The account information can also include a voiceprint for use in speaker identification. Other information may be gathered about the user as well such as address, user preferences, and so on. In one aspect, the user can request or build a personalized menu system for use and presentation to the user when the user later calls the system for retrieving streaming audio. For example, the user may populate their menu with desired programming from the bbc.com and wmal.com. Web server 206 will provide a portal or mechanism, by which users can access open, manipulate, update, or remove their personal account information.

Thereafter, the user can access a phone system 210 via an end user device 202. The end user telephone can be any phone such as a cellular phone, home based phone, voice-over IP phone and so forth. The end user phone 218 communicates via a telephone network 208 with a phone system 210. The phone system 210 includes a simplified account which receives information from web server 206. For example, caller ID information, such as the user's telephone number and PIN or ID number, can be communicated from web server 206 to phone system 210 and stored in the simplified account database. This is the basic information needed for processing the telephone call from the phone 218. The system can communicate the menu system from the web server to the phone system. The menu system can provide access to the playlists of radio stations or streaming website data. Therefore, an example of the simplified account on phone system 210 for a user "John" can include the registered phone number for phone 206, John's PIN, and John's playlist that may include the BBC and WMAL.

Therefore, when John calls on device 206, the phone system will utilize the information in the simplified account and dynamically build an interactive response dialogue 212 for that call. In this case, if John is calling from the phone having the registered telephone number, then the caller ID information in the phone system 210 will recognize that phone number and present John with an IVR that includes in a menu system his personalized playlist of registered or selected radio stations. John can then interact with the system and select 1 for the bbc or 2 for wmal and immediately be connected with the streaming website 214 which then delivers the audio through the phone system 210 and the telephone network 208 to the phone 218.

In some cases, the streaming website 214 will have a static URL which can be used to identify and access the streaming audio. In other cases, streaming websites 214 will protect their streaming audio. Therefore, in one aspect, the phone system 210 or other system associated with a system 200 will simulate a web browser as a proxy for the user of phone 206 in order to interact with the streaming website 214. By managing this interaction, the phone system 210 easily can take the necessary steps to access the streaming audio from website 214 and connect it with user 206 without the user knowing of the underlying processing and therefore, by making it transparent to the user, the user is provided with desired streaming audio.

In some cases, streaming websites 214 may provide a token which may be associated with the perimeter to the URL which is only good for a period of time such as an hour. In this case, if the user desires to receive streaming audio for longer than such time, and such token were to expire, the phone system again will either re-initiate a new browser or receive all the necessary information in order to either restart the time or negotiate an alternate mechanism for receiving the streaming audio such that again it is transparent to the user and user phone 218 to improve their listening enjoyment. If multiple streaming websites 214 are available, the end user phone 218 can store more than one token. This approach can be used, for example, to provide redundancy in the event that one of the streaming websites 214 becomes unavailable. The end user phone 218 can immediately roll over to another streaming website 214 as a source for streaming audio without interruption for the user.

In other cases, a streaming website 214 may provide MP3 files or podcasts several times a day with the latest stock reports or sports news and so forth. In this case, the user may select while setting up their account to simply receive the latest posted report on abc.com, for example, in which case when the user calls the phone system 210, and selects the item from their personalized menu, the phone system, when connecting to abc.com will simply retrieve the last posted report from that website and begin streaming the audio to the end user. End users can share all or part of their audio playlist with others for access via telephone.

This can provide a beneficial service to the user in which they would not simply begin listening to streaming audio which is live, in which case they may start listening in the middle of a news report or the middle of a sports program, but can listen to the entire segment from the beginning. In a similar vein, the end user can "pause" live radio to resume playback at a later time. The end user can pause live radio through a command or by simply terminating the phone call. In one aspect, when the user calls back in, the system can ask if the user wants resume playback from the same source and same playback time as when the last phone call was terminated. The system can also resume playback of paused programming up to several moments earlier to allow the end user to remember what was going on in the programming. The system can use a similar approach when a user receives an incoming call and places the live radio on hold to answer the incoming call. The system can detect when a connection to an end user phone line is placed on hold and taken off of hold. Alternatively, the end user can navigate to an arbitrary position in a recorded audio program using inputs such as a keyboard/keypad or voice commands.

In this case, another aspect of this disclosure relates to altering the mechanism by which a streaming website presents audio in order to more easily facilitate and accommodate telephone users 206 accessing the site. In other words, a streaming website 214 may have their standard live streaming audio for a program but then simultaneously store MP3 files of different segments on their website which may be available to phone system 210 for users that are calling in to receive the information rather than listening in over a live radio station. This easy modification of the data on a website 214 can provide a valuable service for the telephone user 206. This approach can also allow streaming websites to expand to new markets and track customer trends in these new markets. Such enhanced listenership and tracking can allow for increased advertising rates and increasingly targeted advertising.

Another aspect of FIG. 2 involves an ad server 216 that communicates with the phone system 210. In this case, the ad server may simply store ads or may also receive state information such as the phone number, a time, a day, a location of the device 206, as well as the content options of the user account, to identify ads to present to the particular user. These ads may be presented prior to the phone 206 being connected to streaming audio from the website 214. The ads may also be interspersed and be used to replace advertising that is presented in the stream of audio. In a related aspect, the end user device 202 and/or the end user phone 218 provide additional non-speech information to the phone system 210, the web server 206, and/or the ad server 216. This additional information can include information from the user devices, such as GPS location, preferences, lists of contacts or frequently called numbers, and a record of user interactions. The device can automatically gather this additional information. The device can periodically transmit this additional information or it can transmit additional information as it is generated. The ad server 216 can incorporate this additional non-speech information to select appropriate ads for specific users.

This approach can be useful because advertisers can target very narrow segments of listeners. For example, a listener in Rush Limbaugh's audience is very different from a listener in Howard Stern's audience. Local advertisers can target only those listeners in particular audiences within a certain geographical radius having an income above a certain threshold, for example. The phone system 210, ad server 216, and the web server 206 can coordinate shifting the audio presentation from an IP multicast, broadcast (one entity streaming the same media to multiple receiving entities), or similar approach for broadcasting radio over the telephone to a set of unicasts to a set of IP unicasts (one entity individually streaming different media to different multiple receiving entities), and back again. One example of how this can work is a radio station streams audio to multiple different listeners over the phone. During the commercial break, the multicast stream is put on hold and individual unicast streams are established with each listener to deliver targeted, user-specific advertisements. After the commercial break is over, the multicast stream is resumed and the listeners continue to enjoy the original multicast stream.

A radio host can also benefit from the additional non-speech information. For example, a radio host's computer can display aggregated statistics describing user behavior, locations, listening duration, and so forth. Trends and patterns in this information can be used for more accurately establishing advertising rates. Individual user devices can automatically send information about an individual user's interest, political party affiliation, pre-established profiles (moderate, fiscal conservative, socially liberal, Redskins fan, etc.) to the radio host. If there is a small amount of callers the host can see individual information.

As more callers or devices connect, then the information can be aggregated such that the host can select a grouping of those who are fiscally conservative but socially liberal and easily drill down to identify someone desirable to connect with and add to the live conversation. Users can also of course indicate whether they are open to being selected by the host for joining the live program. In other words, a filtering approach can be implemented wherein only users that connect with the streaming audio who want to be picked or are willing to be picked can so indicate and then the information about the interests of this subgroup can be presented to the host. As can be seen, these features enable a much improved and dynamic interactive environment for the live radio program.

In another socially interactive aspect, end users can create and join groups of listeners. Members of such groups and dial in to a particular radio show and, at the termination of the show, remain on the line to discuss the radio show with other members of the group in a form of conference call. End users can also tag a certain part of a radio show for sharing with others, via email as an MP3 file, via a posting to Facebook, or via a blog, for example. The end user can also add voice annotations to the tagged part of show. These and other user-to-user interactions are also possible using the principles disclosed herein.

In another aspect, assume that user 206 is driving and desires to listen to a live football game in which audio is being streamed for the game over streaming website 214. The user can call telephone system 210, be identified to the system, and be connected to the streaming website. However, the particular time at which the user dials into the system may be in the last 30 seconds of the football game. The user may want to listen to the last quarter of the game rather than jumping right to the end and to identify how the game ends. In this case, the concept of the streaming website storing segments of the streaming audio that may be played back from a particular starting point. In this case, the user may be either automatically or based on a selection of user preferences in their account, presented at this stage with an additional menu system which enables them to select where to begin streaming the audio.

In this case, the system may present the user with the current time left in the game and present the user with the option of starting the audio stream at the current time, at the beginning of the 4th quarter, the 3rd quarter, the 2nd quarter or at the beginning of the game. In this case, the user can be presented with the opportunity to enjoy more context and more aspects of the current game rather then just finding out the concluding score without listening to the further parts of the game that would build up to that perhaps climactic conclusion. Of course this aspect may be provided with any programming if the user desires. In a related aspect, audio streams can include links to other audio content. Such links can be voice activated.

For example, a sports commentary discussing a football game after the fact can include voice-links allowing a user to review particular parts of the game after hearing the commentary. A commentator can say, "That was not the best strategy, Bob. In that position the smarter move would have been , . . . " After this, the streaming website 214 can provide a visual, audible, or other cue indicating a link. The user can issue a voice command such as "Show me" or "Replay" or provide some other form of input. The streaming commentary stops and the streaming website 214 streams the audio content indicated by the link. After the linked audio content stops, the streaming website 214 resumes playback of the streaming commentary.

It is contemplated that the entity providing this communication service between the streaming website and the user will engage in agreements with streaming websites which may enable them to provide the streaming audio in a preferable industry standard mechanism. Therefore, it is not a requirement of the present disclosure that a simulated browser be used inasmuch as the mechanism by which the audio generated from the website can be communicated to the end user may be altered or simplified.

In one aspect, a registered user may call from a phone that differs from registered phone 218. In this case, the phone system 210 merely requests the user to enter in their telephone number and personal identification number (PIN) in order to retrieve their simplified account and build an IVR for that session. Therefore, there is no restriction on a type of phone or whether the phone is registered in order for the registered user to receive streaming audio.

While FIG. 2 illustrates a separate account in web server 206 and a simplified account in system 210, another embodiment can simply use a single database in which various pieces of information, as necessary, are utilized. Accordingly, it is contemplated that the accounts can be separate or unified.

In another aspect, because the entity providing the service may engage in negotiations with streaming websites 214, certain accounts and particular websites may be identified and treated differently. For example, abc.com may be given a particular phone number or particular users may be connected directly with abc.com when they call in. There may be a special phone number in phone system 210 in which a registered user will call, rather then calling the standard phone number which presents them with an IVR menu system, a separate phone number may be provided in which the person with a registered account would be connected to abc.com directly. In this case, the system 200 acts as a brokering system between users 206 and streaming websites in which an agreement is entered into with a streaming website 214 or a streaming entity, the system then receives a call at the system and based on the called phone number and perhaps personalized account information, the IVR system may be bypassed and the user can be directly connected to the audio stream.

Figure 3:
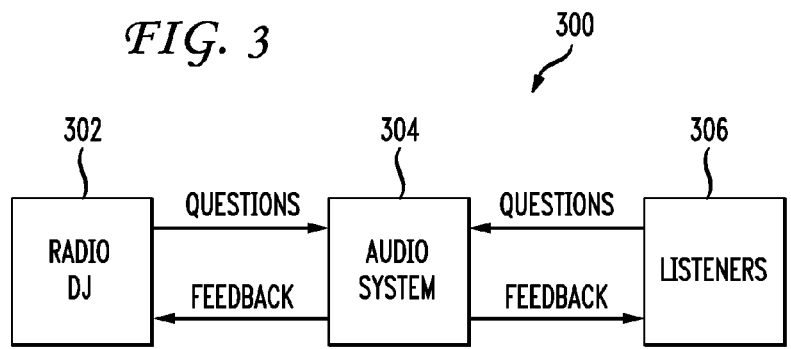
FIG. 3 illustrates an example of providing listener feedback to an audio program.

FIG. 3 illustrates another aspect of the disclosure which applies to live streaming audio. FIG. 3 illustrates a system 300 in which a radio host 302 is in a live program which is streamed over the Internet and thus being available to be communicated via the audio system 304 with listeners 306. In this case, because the users are on a telephone or some other listening device, an aspect of the present disclosure involves listeners to be able to provide feedback which can be touchtone or data related in any mechanism. Here, an example of the mechanism by which this would work is assume a radio host has his or her radio program being streamed live and the host logs into a password protected website which can provide feedback information for the program. The host may ask a question such as "rank the latest Spiderman movie from 1 to 10", listeners could immediately provide that feedback via their listening devices which data is correlated by audio system 304 which then can provide the feedback to the host via the private web browser of the host thus dramatically enhancing the interactive nature of the telephone experience.

The ability also of the audio system 304 to be a broker and to connect listeners with radio stations also enables improvements in the mechanism by which callers would call into a radio station. For example, listener 306 may have called into audio system 304 just to listen to the streaming audio but then that user while conveniently on their telephone may desire to call in and talk to the host. In this case, feedback can be provided from the user such as pressing a particular number on their touch-tone phone or providing other input if capable based on the device (such as a Palm, Blackberry, or Apple iPhone which provides additional data entry modalities and opportunities), then system can indicate that they desire to communicate with the host. Here, the user may also be able to provide information about what they desire to say. For example, if the topic of discussion is politics, then the user may be able to identify that they are members of a particular political party and may even be able to provide a brief 2 minute discussion of what they would like to say.

For example, typically users will call into a system and a call screener will talk to the listeners and determine if they should be placed into the queue for the host. In this case, the host can then see the callers in the queue and receive preliminary indication of what the caller would like to say. In this aspect of the disclosure, the listener may be able to identify that they are a democrat and simply speak into their telephone and give a statement of what they would like to say, which statement may be transcribed and either provided directly to the host or to a call screener which enables them perhaps a greater opportunity of being selected for being chosen to be on the program. Additionally, particular information from the user and/or the user device may be provided or stored in the user account which can also then be presented to the host for further information to determine whether they should be selected, such as geographical location.

This approach enables a much more flexible and powerful opportunity for interactive radio. For example, the host may be able to interact with multiple users at once and be able to select people who are much more interesting on their program than otherwise could be possible by virtue of a single telephone caller screener. In other words, assume the user has 100 listeners via the audio system 304 that can provide feedback to the host. The host for one thing via the web browser may be able to know exactly how many users are in this possible interactive environment and may ask those users to provide a rating of a particular candidate for office. Assuming that the host knows that these 100 users are interested in also talking on the program, the host may be able to then receive information about the various feedbacks and the host may be able to select one of the users based on that feedback and put them on the air.

For example, the host may want to interview a particular user that either loves or extremely dislikes a particular candidate to probe and ask them why they provided that particular feedback. As one can see, the ability to provide this live 2-way communication with listeners of a live radio program can provide many enhancements to make the program much more interesting. In fact, in another aspect, such live interaction may dramatically alter the programming itself For example, a commentator on a radio program may be providing a certain point of view on the outcome of an election. Assume again that there are 100 listeners that are capable of providing feedback via the mechanism disclosed herein. Assume also that the system is capable of receiving political affiliation as well as the mechanism by which feedback can be provided. The commentator on the radio can then ask whether the audience agrees with his analysis. In this case, via the live feedback mechanism, the commentator may know that a certain percentage of the overall audience agrees with his point of view or also may receive a breakdown of data based on political party or any other categorization of the listeners to determine immediately whether listeners agree or do not agree with the assessment. As one can see, the audio system 304 and the feedback capabilities disclosed herein may provide a much more dynamic and interesting environment for live radio programming.

Figure 4:
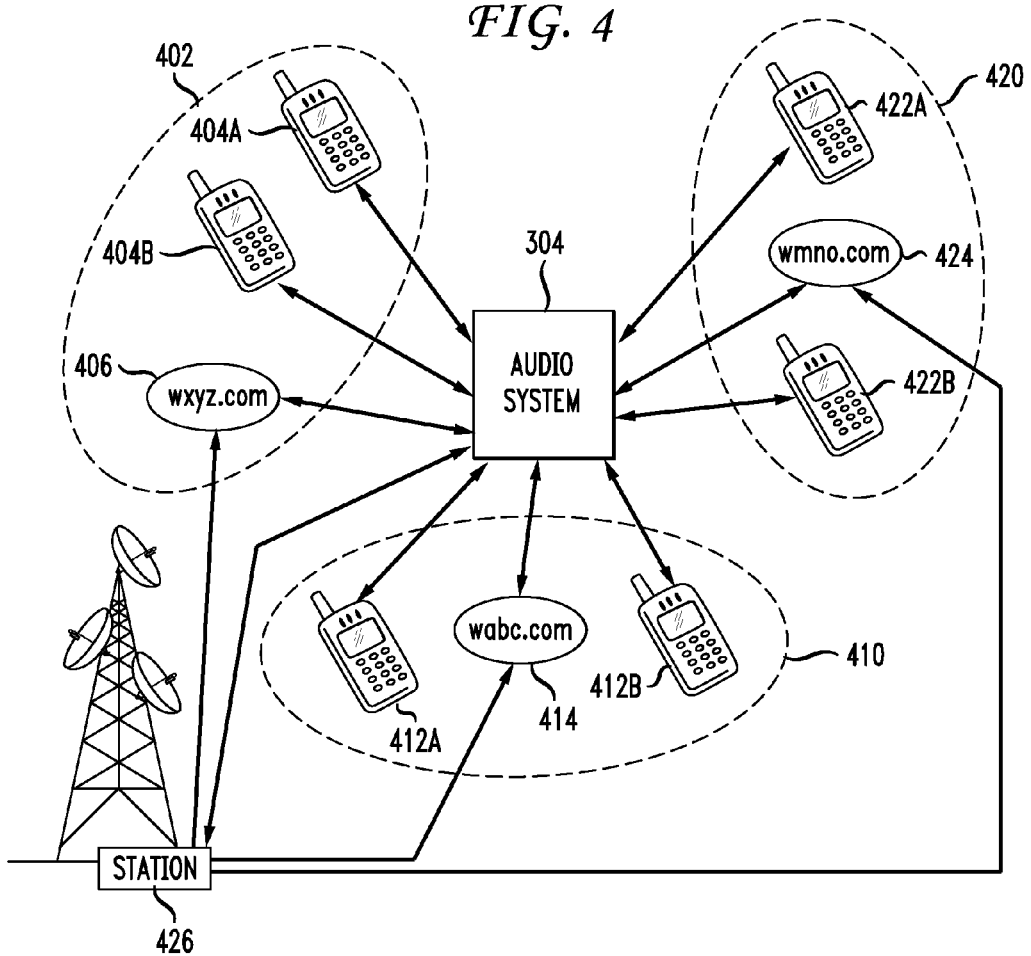
FIG. 4 illustrates an audio system that receives calls and communicates with different streaming websites.

Some radio stations broadcast through a number of different local markets. FIG. 4 illustrates this point and how the principles of the present disclosure address this scenario. Here, radio station 426 broadcasts in its markets and also transmits its signal for rebroadcast in several markets 402, 410 and 420. Each of these separate markets has their own radio station call signs and broadcast over different websites wxyz.com 406, wabc.com 414 and wmno.com 424. It is well known that many stations simply purchase programming from another network and rebroadcast the program. For example, station 426 may have a 2 hour time slot in which they broadcast a comedy show with a host. Stations WABC, WXYZ and WMNO may simply rebroadcast that should during that two hour slot.

In this scenario, there is a need for callers in the particular areas to be able to listen to the programming. For national programs, a single server that is streaming the audio over the Internet may be overwhelmed with the demand. Therefore, one advantage of having numerous local websites streaming the program is to distribute the workload. In this case, callers can call the audio system 304 from devices 404 in market 402 and receive streaming audio from the radio station they are familiar with wxyz.com 406. Other callers in respective areas 410 and 420 can do the same. The audio system 304 also coordinates and enables individual callers not only to listen but to provide the ability of two way interaction and localized data.

In this manner, the radio host can ask for all the callers in geographic area 402 (assume this is California, or New York, or any described region) to press 1 if they agree or 2 if they do not agree with the current point the host is making. The audio system can even receive a click indication from the host at the station 426 via the Internet that identifies the region or via speech recognition. System 304 then utilizes its databases and location identification data to only count or tabulate the responses from callers in region 402. This data is then immediately presented to the host at station 426 for further commentary. This kind of interaction of course can also occur on devices besides telephone devices, such as users at their computers listening over a streaming website. This approach can increase the ability and pool of people that can have this kind of two-way interaction with a radio host.

This approach enables the system to aggregate callers by region, such as by telephone area code. As noted above, the host can then broadcast a general alert to all listeners which calls for participation from a specific group of listeners. For example, a talk show host discussing national news can say "To all my listeners in Pittsburgh, press 1 on your phone if you have been affected by the flooding and press 2 if you have not." In this case, the system can filter incoming communications to only accept keypad input from those listeners in or around Pittsburgh. The determination of "in or around" can be loose or strict.

For example, cell phones having a Pittsburgh area code may still participate, even if they are not actually located in Pittsburgh during the call. As another example, a billing address in Pittsburgh on the phone statement can provide sufficient evidence of "in or around" Pittsburgh, even if the listener is actually calling from California. Many other variations exist and can be combined in various forms to filter callers based on a regional group. This principle can also apply to a very small area, such as a college radio station. In order to foster school spirit and unity, a college radio station may only allow listeners from on-campus phones or from cell phone numbers associated with faculty or registered students.

In another variation, a host can ask a subset of listeners or all listeners to voice their opinion regarding a certain topic. For example, a broadcaster can say "Please take the next 30 seconds and speak your mind about the scandal in Washington. After the break, we'll hear some of them at random." During the 30 second interval, the system can broadcast soft music, silence, or other information related to the request for opinions. The two-way communication feature of the system allows the broadcaster to collect and record these opinions en masse for later playback. An automatic speech recognition system, either on the individual phones or on a server provided by the broadcaster, can recognize the speech and tag and/or classify the recorded speech, perhaps even with an entire transcription of the speech. In this way, a broadcaster can easily sort through and find the desired speech samples for broadcast playback to the entire audience.

Another advantage of the arrangement in FIG. 4 is that it enables users to call local telephone numbers for receiving the streaming audio from their local streaming website. Different advertising or messages may be sent to callers on a regional basis or on the basis of which geographic region they are calling from or the website which they choose to listen to. For example, a caller 404 may be outside of region 402 (assume they are in region 410) but desire to receive the streaming audio from WXYZ rather from the local radio station WABC for that region. This may be because the local news and information is provided during the commercial and news breaks from the show. Knowing this information, the system 304 may present a different advertisement than otherwise would be sent to a user in region 410.

In another embodiment, users are able to control recordings of the streaming audio either that are performed by the website or via user control. A first aspect of this embodiment applies to websites like rushlimbaugh.com which store each day's broadcast in either total programs or hour segments. Here, the system can provide a caller with an ability to navigate over the phone to begin streaming a stored broadcast. For example, the system can provide a user with a phone number for the live program (the system could then negotiate with the streaming website to determine if the caller is registered with the website and authorized to listen) and another phone number for the stored previous programs. If the user calls to listen to a previously stored program, the IVR can present the user with the options, such as, press 1 for yesterday's program, press 2 for Tuesday's program etc. There of course may be a single number that can be called which asks the user if they desire the live streaming audio or the recorded audio. The system 304 handles all the negotiations and interaction between the user devices and the source of the audio to make connected to the desired audio simple and easy over the phone.

In another aspect of this embodiment, the user can specify a desire to record a program. This may be via a scheduling ability or via an interaction to indicate a recording of the currently playing program. System 304 can then begin to store an audio file associated with the user's account for later retrieval by the user. In this manner, rather than going to the program's website, the user can specify with their account settings to record the program every day at noon. Then, the user can simply call in and retrieve his or her own copy of the streamed program. As several programs become recorded for the user, the IVR can be dynamically modified to ask when they call for recorded programming, "press 1 for Rush Limbaugh, press 2 for Car-Talk , . . . "

Not only can the system be programmed to record streaming audio for the user, but telephone calls can be programmed. For example, the user can specify to the system 304 to schedule a call every morning at 7 AM during a commute time so that the system can play a certain recording such as the daily marketplace podcast or a live stream. If a user is driving, they could of course listen to their local radio station but if they desire a different radio station in a different geographic region, this enables a simple approach to retrieving the audio they desire.

Figure 5A:
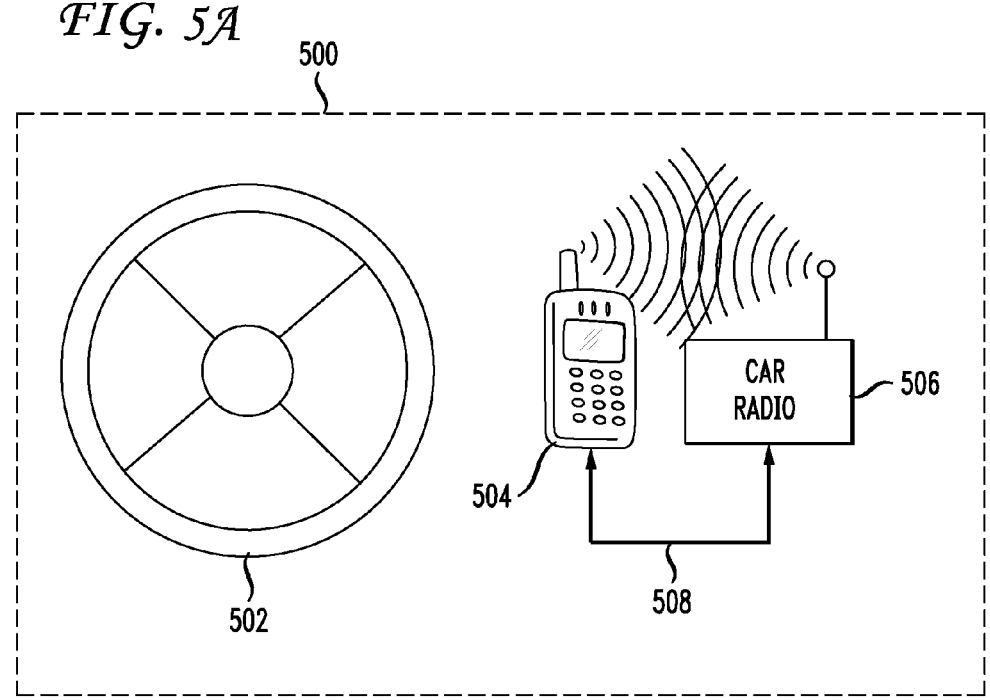
FIG. 5A illustrates an embodiment for use in a vehicle.

FIG. 5A illustrates the operation of an audio device 504 and a vehicle 500. Steering wheel 502 is shown by way of illustration. The telephone or audio device 504 communicates with a car radio 506 either through a wire link 508, through a Bluetooth connection, or other wired or wireless connection. In this case, the system can communicate and enable the user to be able to listen to programming in a more efficient manner than is otherwise possible. For example, in many instances if a user is listening to AM radio, the AM radio signals cannot penetrate into a metal structure such as a parking garage. In this case, often when users are listening to a program and drive into a parking garage the AM audio signal is lost. In this case, an aspect of this disclosure involves the ability to communicate between a car radio 506 and a device 504 information that the current radio station is an AM radio station (or a FM station as well) that is no longer receiving a strong signal. If the user has registered that radio station with audio network 304, then a signal can be sent to the device 504 to call the audio network 304 and navigate to the particular radio station that was currently programmed at the car radio 506 and to continue that communication. In this case, device 504 may be able to communicate via cellular signal or other signal with its network such that the user can continue to listen to the current program.

In another aspect, the user provides instructions within their account wherein if such an event occurs, then the audio system 304 would automatically begin to record the program at the point in which the signal was lost. In this case, the system may be programmed with intelligence to enable the automatic scheduling of both a recording of a program as well as a telephone call back to device 504 the following morning. A simple scenario illustrates this point.

Assume that a user has 10 minutes left in the live streaming audio program that they are listening to in their car 500 and begin to drive into a long tunnel. The communication between the radio and device 504 may be sufficient to store information on device 504 that the last ten minutes of the program were not received. Either at that time or at a later time, device 504 can communicate with audio system 304 those details. If it is possible to receive that information at that time, the system can immediately begin to record the last 10 minutes of that program and schedule a call the following morning at 7 a.m. during the driver's commute. In this case, the system could insert that missed portion at the beginning of the streaming audio that is regularly scheduled for the user in which case the user would be able to complete listening to the last 10 minutes of their program and then continue with their marketplace report podcast or their regularly scheduled audio programming.

In another aspect, if the system was unable to immediately begin recording the last 10 minutes of the missed program, then the information about which portion of the program was missed could be stored on device 504. If the circumstances in which no communication signal is possible last for 20 minutes, then as device 504 is again able to communicate with audio system 304, the information may be provided regarding which portion of the program was missed and the system 304 can determine whether such a program is stored at another website. If so, then audio system 304 can dynamically extract those 10 minutes from another stored location and provide that programming to the user on demand or automatically via a scheduled call.

In another aspect, the system, once such recording is available, can send a message to the user (for example, after the 20 minutes and when communication is again opened) and let the user indicate whether they would desire to listen to the last 10 minutes of the program at that time. This facilitates an easy mechanism by which listeners can receive the information they desire.

One simple example of this approach might be wherein a user is driving and listening to a football game with the last few minutes of a very tense and tight game. If the user is somehow unable to hear that portion of the game, the disclosure herein provides the ability of that to either be dynamically recorded or retrieved from some other stored location and as soon as the capability is restored for communication, the user can listen to the remaining few minutes of the game via device 504 which was incapable of being received live via the car radio 506.

Figure 5B:
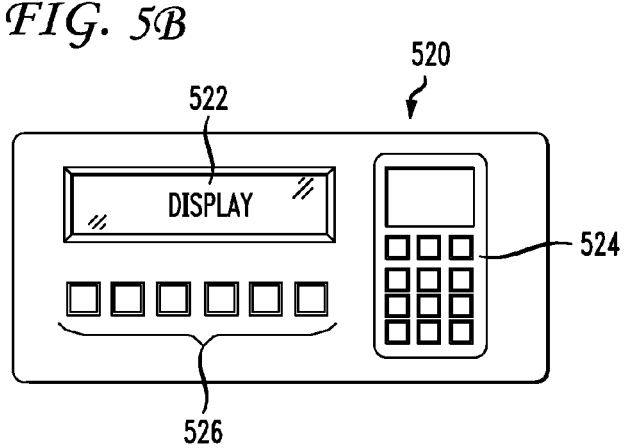
FIG. 5B illustrates an embodiment in a car-radio.

FIG. 5B illustrates the integration of a radio 520 with a display 522 and standard radio buttons 526 with a cellular or other communication device 524. In this case, rather than having a separate Bluetooth or wired connection as shown in FIG. 5A, an aspect of this disclosure is the integration of these capabilities in a single device. In this case, the programming would occur in a mechanism known by those of skill in the art and would provide the capabilities set forth above to switch between communicating via the radio antennae associated with radio 520 or an antennae associated with the cellular device 524. Accordingly, this integration provides an easy mechanism by which users can alternate between communication means and ultimately receive the audio programming that they desire.

One mechanism for enabling this transfer to telephone feature is using tags like the known QR code or Microsoft tags. The panel 522 can display a tag that identifies the station that is currently being listened to and the communication with the phone 524 or 504 can recognize that tag to be able to identify the desired radio station which can connect to audio system 304.

FIG. 6 illustrates an example of this approach. The method first involves receiving programming instructions (602). These instructions can include such information from the user as a desired program to record as well as a particular time to call and play the streaming audio. For example, the user may desire the system to record the previous day's market place report. If the user typically commutes between 7 a.m. and 8 a.m., the user can request that the system 304 call the registered phone and begin the market place podcast at that time.

The next step includes scheduling a recording of streaming audio and a telephone call (604). The system, with its instructions, then proceeds to record and store the streaming audio (606). Next, at the appointed time, the system calls the registered device and replays the stored audio (608).

In one context, the user may instruct the system to call so the user may receive streaming audio. In some cases, it is known that at the beginning of a hosted radio program, advertisements may run for the first 6 or 7 minutes. Therefore, the user could program the system to schedule a call at 12:07 p.m. Therefore, when the user is in their vehicle, they receive a telephone call from the audio system 304 which begins the live program just following the initial advertising.

Also included in this mechanism is the ability of the user to easily modify the scheduled telephone call. For example, if the user is running late and is still at home at 7 a.m. when the telephone call is received on their cell phone or audio device, the system can present on a display with the information that the particular call is to begin the streaming of audio with the ability to press a button that ends the call and the system will call again in 15 minutes or a half hour. In this manner, the system could present a dynamic snooze-type button in which the user can delay the call a certain amount of time. This of course can be accomplished either through a touch sensitive display, a DTMF tone, or in any other manner.

Figure 7:
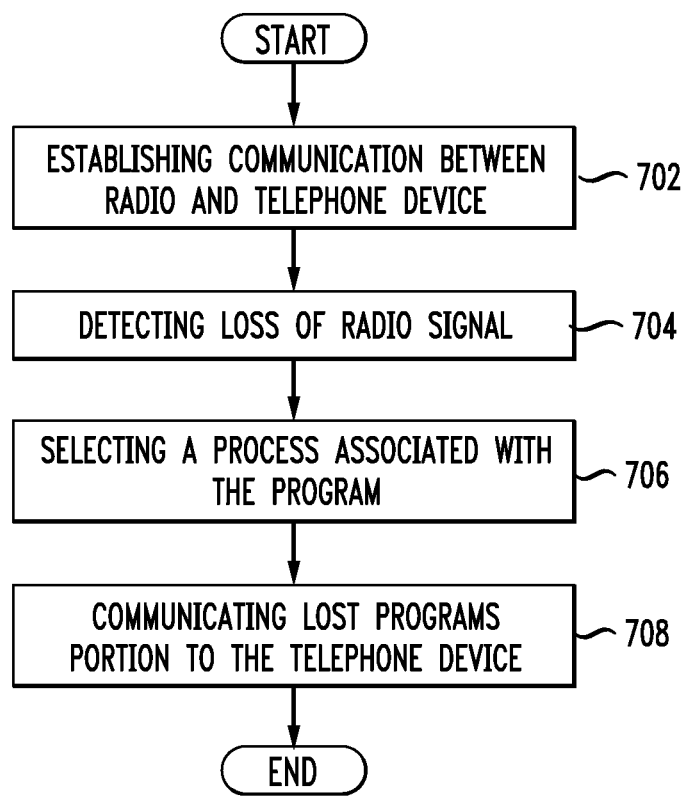
FIG. 7 illustrates another method embodiment.

FIG. 7 illustrates some of the principles set forth above. In this method embodiment, a first step is to establish communication between a radio device and a telephone device (702). This of course can be done either via Bluetooth or the integration of these devices into a single device. Next, the method includes detecting a loss of a radio signal (704). At this stage, the system selects a process associated with the program (706). Again, for example, the process may involve identifying whether the telephone device is currently capable of communication such that the system can perform the step of communicating the lost program portion to the telephone device (708). Another process that is associated with the program, which may be selected because the telephone device is also incapable of communication, is to immediately begin recording the lost program portion for later retrieval by the user. Yet another process may be, if the telephone device cannot communicate with audio system 304, to simply store information associated with the time at which the radio signal was lost. In this case, the selected process would involve storing the data associated with identification of which portion of the program was not received by the radio 506 and when communication is yet again possible with device 504, transmitting that data to audio system 304 for further processing by retrieval of that lost portion of the program. In this manner, the system can then present either via a scheduled call or immediately the opportunity of the user to receive the lost program portion through device 504.

The above principles also enable the transfer of the radio program from the radio 506 to the device 504. Therefore, if the car gets turned off, the system can present the user with the option of transferring the program to the device 504. Since the information about what radio station is being listened to can be transmitted from the radio 506 to the device 504, the device can ask the user if they desire to continue with the program. A simple response can enable the user to have the programming transferred so that they can continue to listen. If necessary, a brief overlap or replaying of the last few minutes can also be provided which ensures that they have not missed any of the program. This information can be sent in tags between the devices as noted above.

In one embodiment, a listener using a radio desires to continue listening to a radio program broadcast uninterrupted, but must leave the radio. Either the radio or the telephone can include a "transfer to telephone" button or switch which transfers output of the broadcast to the telephone (or to another telephone). For example, pushing "transfer to telephone" can detect the currently playing broadcast, negotiate and establish a connection to the appropriate stream, start audio output of that stream, and automatically turn off the radio.

Figure 8:
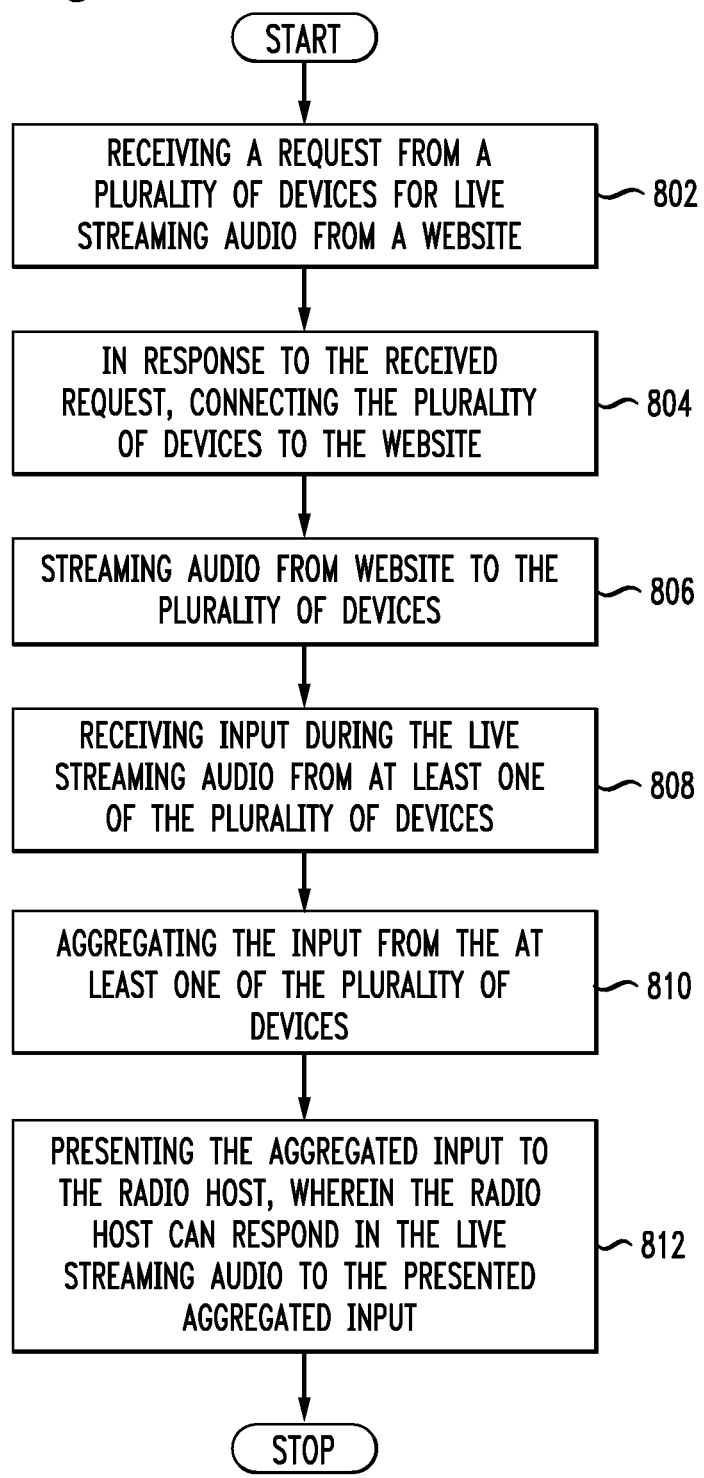
FIG. 8 illustrates a two-way communication method embodiment.

FIG. 8 illustrates a method embodiment of the disclosure related to two-way communication between a radio host and callers or users of audio communication devices. The method is computer-implemented or processor implemented in that it is practiced on a hardware device that is capable of performing the necessary steps disclosed herein. The disclosed method relates to communicating information between a radio host and a calling device and includes receiving a request from a group of devices for live streaming audio from a website (802), and in response to the received request, connecting the group of devices to the website (804), streaming audio from website to the group of devices (806), receiving input during the live streaming audio from at least one of the group of devices (808), aggregating the input from the at least one of the group of devices (810) and presenting the aggregated input to the radio host, wherein the radio host can respond in the live streaming audio to the presented aggregated input (812).

The request for streaming audio can be a telephone call from the device to an audio system that connects the device with the website that streams audio. A webpage (not shown) is presented to the host at station 426 via a password login that shows the data and enables the host to interact with the audio system 304. In one aspect, the host at station 426 may not be broadcasting over the airwaves but may simply be a person hosting a streaming audio show over their own website. In this case, the present disclosure enables a new mechanism for individuals running their own radio programs and interacting audibly with users. The method can further include presenting to the radio host information about callers listing on the group of devices and that provided the input that is aggregated and presented to the radio host, receiving from the radio host a selection of one of the callers and connecting a selected caller device with the radio host in an audio communication, wherein the selected caller and the radio host can talk live.

In another aspect, the method includes presenting the aggregated input to the radio host by presenting a graphical image summarizing the aggregated input. The received input is input can be from users of the at least one of the group of devices in response to a question from the radio host. The received input can be automatic input about interests of the user of the respective device. For example, when the user connects to the system, a profile stored on audio system 304 for that user can be presented or followed in how the interests of that user are presented to the host.

The method can further include receiving a selection of one of the users of the group of devices by the radio host based on the presented received input which informs the radio host of the interests of the users of the group of devices and, in response to the selection of the one of the users, connecting the selected one of the users to the radio host such that a live audio conversation occurs between the selected user and the radio host. The individual users can indicate their willingness to be selected by the radio host and wherein only those who so indicate have their information presented to the radio host. Individual users can indicate such willingness on a per-issue basis and/or on some other categorical or scheduled basis. For example, a medical doctor listener can be willing to speak with the radio host regarding national health care issues, but not regarding foreign policy. The willingness indication can also include a degree of willingness, such as a scale from 1 to 10. This indication may be done via their user profile or live feedback which turns on or off their availability to be selected.

Principles set forth above establish the foundation for the next embodiment. This embodiment is illustrated as the system 900 in FIG. 9. Here, this embodiment provides for an easy mechanism for any person to become a radio broadcaster over the Internet and to interact with users with the principles set forth above. In a first aspect, a person that desires to broadcast audio over the Internet can access the audio web system server 916 and sign up for the service. In this case, they may purchase either through this service or any other known service a URL such as www.johndoe.audionow.com. In connection with the URL, the user will obtain access to a personal radio hosting interface 902 associated with the personal radio station 904. The user speaks into a microphone 920 connected to the client computer 922 and clicks on a button 906 which may be entitled "click to broadcast". In this case, the user can then begin to talk and their audio signal can be broadcast to their radio station.com or a personalized URL such as johndoe.audionow.com 912 via the audio/web system 916. Using the principles set forth above, various devices 918A-918C, such as landline phones, cellular phones, computing devices using Voice over IP (VoIP), and other audio communication devices can call or access the audio web system 916 which will connect the devices with the streaming audio from webpage 912.

Also using the principles set forth above, the audio web system 916 can receive and aggregate feedback from the various devices 918A-918C that are listening to the live broadcast and present individual information about listeners such as via data 910 and/or aggregate information via a graphical presentation 908. In this case, the radio host viewing interface 902 can both broadcast live as well as manage his or her own live radio program. Since interface 910 presents individual information about listeners, its information can be coordinated with other information such as data 908. The user can locate the pointer 924 and select any of the identified listeners, which, upon selection, will be connected via the audio web system to the hosting webpage such that the radio host can engage that listener in a conversation. The listing of listeners 910 can also be filtered to highlight and aid the radio host. For example, those listeners with the longest listening history can be first, or the newest listeners based on listening history can be first with data indicating their status. In this manner, the radio host can select the type of listener to patch through to the live broadcast. Many variations on how list 910 can be filtered and sorted are contemplated.

The filtering and sorting may also be dynamic based on how the conversation proceeds. For example, if the radio host asks for feedback on a certain point, the data 908 may present an aggregation in general but the system can modify or re-present the listing 910 in a different order based on the aggregation of the feedback. In other words, data 910 may first present the listeners in order of who has the longest history of listening, but after a query about a ranking of 1-10 what they think of the new BMW convertible sports car, the listing 910 can be modified to list first those who ranked it a 10 or at least an 8. This dynamic nature of listing 910 enables the radio host to easily update the ordering of those listening such that easy selection can be made of a person to link into the conversation by the current issue being discussed. Here, the radio host can select the top listener and ask "OK, Joe, you are on, why did you rank the car a 9? No one even ranked it a 10, what is your opinion? . . . "

Audio/web system 916 can also provide the individual radio host with all of the capabilities such as archiving, storage, and enabling users to access such archived audio programs via the website 912.

An example provides the next feature of the system 900. Assume that an individual radio host broadcasts everyday at 6 pm but on one day is stuck in traffic and cannot make it to their computer 922 for providing the program. The audio/web system 916 also can enable such radio host to call in via a device, such as a device 918A, and access the interface 902 and be able to connect to a simple set of controls, click to broadcast 906 and provide their audio through device 918A. In this case, it provides additional flexibility for broadcasters to be able to maintain their desired broadcast schedule. A reduced version of interface 902 can be presented to the user if they are calling in with a mobile device that has a reduced screen size and capability. In this manner, much of the basic functionality is preserved if the user desires to control the live broadcast program in much the same manner as from a desktop or larger interface 902.

Also in another aspect, the audio/web system 916 will enable radio hosts to prepare and organize their broadcast. In one example, interface 902 will present a user with options of advertisements or additional filler audio programs that are available. As an example, the user may be providing a political commentary in which audio clips from other sources may be desirable to quote. In this case, a search window 926 may be provided with various audio clips that as the user is talking on microphone 920, they can also select and play an audio clip which not only will be played to their own speakers attached to computer 922 (not shown) but also would broadcast that audio clip through the audio/web system 916 to their streaming website 912. In this case, the user can provide additional capabilities via the interface 902.

Other capabilities also may be available through such a window as 926 in which a user may desire to have a portion of text read by a text-to-speech processor or other synthesized speech processor through their streaming website 912. Currently, various mechanisms exist for users to be able to click on articles and have them read to them by synthesized voices. In this case, interface 902, in additional to merely providing text to be read to the user, would enable the user to also have the audio of that text be broadcast through their website upon demand. Thus, if the user were commenting on a particular section of the Constitution, the user could, in window 926, have the Constitution up and could highlight a paragraph or a section to be read by a synthesized voice and at the desired moment, the user could click a button indicating that the text-to-speech should begin reading that portion. Thus, the interface 902 can enable a personal radio host to have a great degree of flexibility in presenting the information that they desire.

In another aspect, interface 902 also provides the radio host the ability to pause and restart any text-to-speech (TTS) audio or audio clip such that they can easily insert their own commentary and then continue with the audio clip or TTS reading. This GUI interface (not shown) will have standard start/pause/stop buttons for controlling the audio being played at device 922 and being streamed over the host's website.

Figure 9:
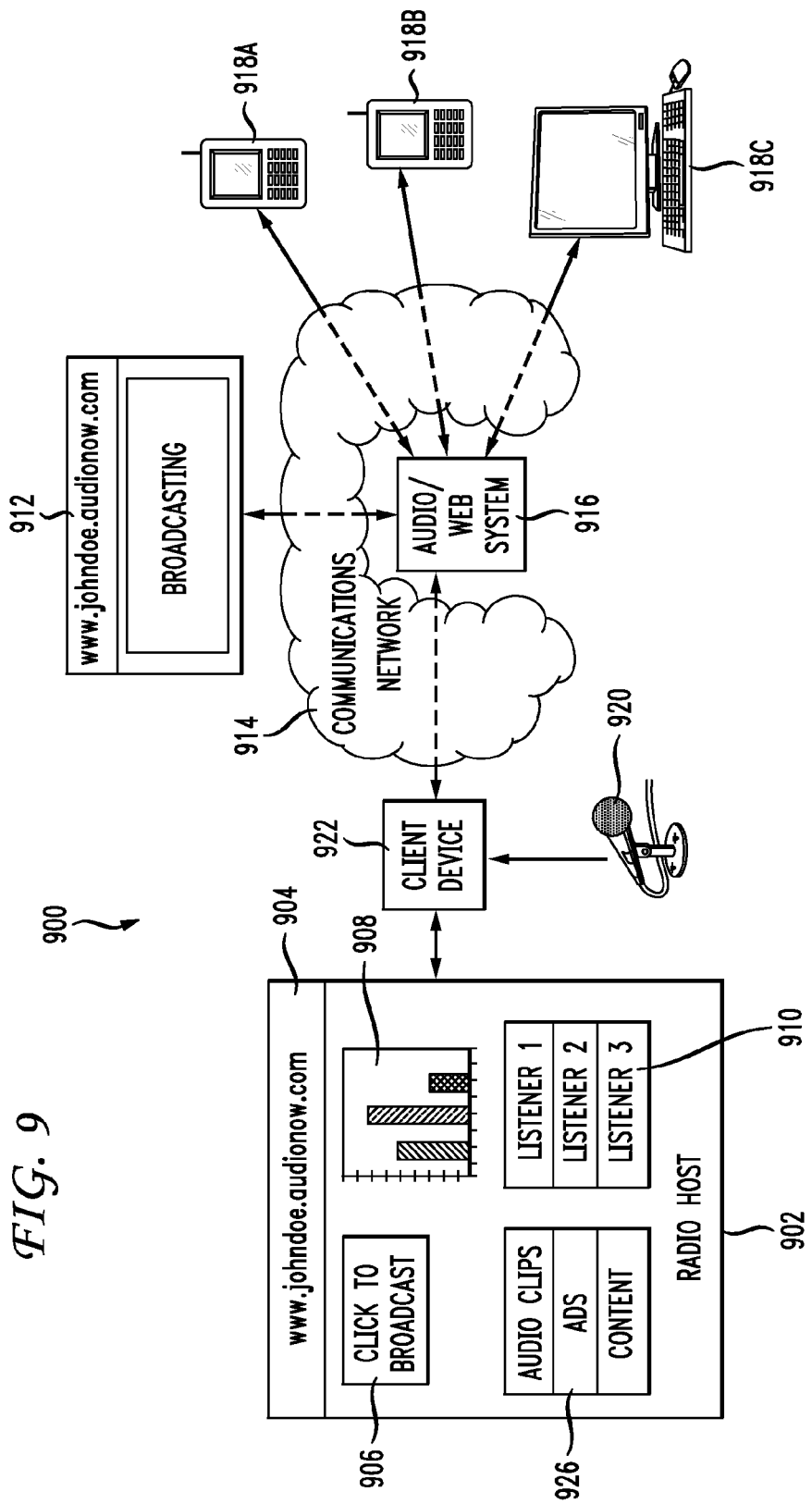
FIG. 9 illustrates an embodiment related to a personal radio hosting system.

Similarly, interface 926 can also enable the personal radio host to also select their own advertisements which can generate income for, or at least cover the costs of, their program. Thus, the audio/web system 926 can also present the user with various options and selections for advertisements which can be broadcast as part of their radio program. Also shown in FIG. 9 is a general presentation of a communication system 914 such as the Internet, which might also include a telephone interface, a satellite link, cable link or other known or hereinafter developed networks for communication.

The audio/web system 916 can provide various levels of broadcast packages for personal broadcasters. For example, the system 916 can provide an inexpensive, bottom-tier plan that provides a URL to broadcast over the web with no interaction and people can simply call in to listen. The system 916 can provide a slightly more expensive next tier plan that allows the host to broadcast over the web and take calls using a single phone line. More expensive plans can include more phone lines, increase levels of interaction, and so forth. In one case, the host pays nothing but the broadcast includes advertisements which cover the system 916 cost of broadcasting. If the host's broadcasts become sufficiently popular, the system 916 operator and the host can share the ad revenue. The audio/web system 916 provides a simple, centralized infrastructure that handles back-end details of running a personalized broadcast for listeners via telephone, mobile device, and/or network-connected computing device.

Figure 10A:
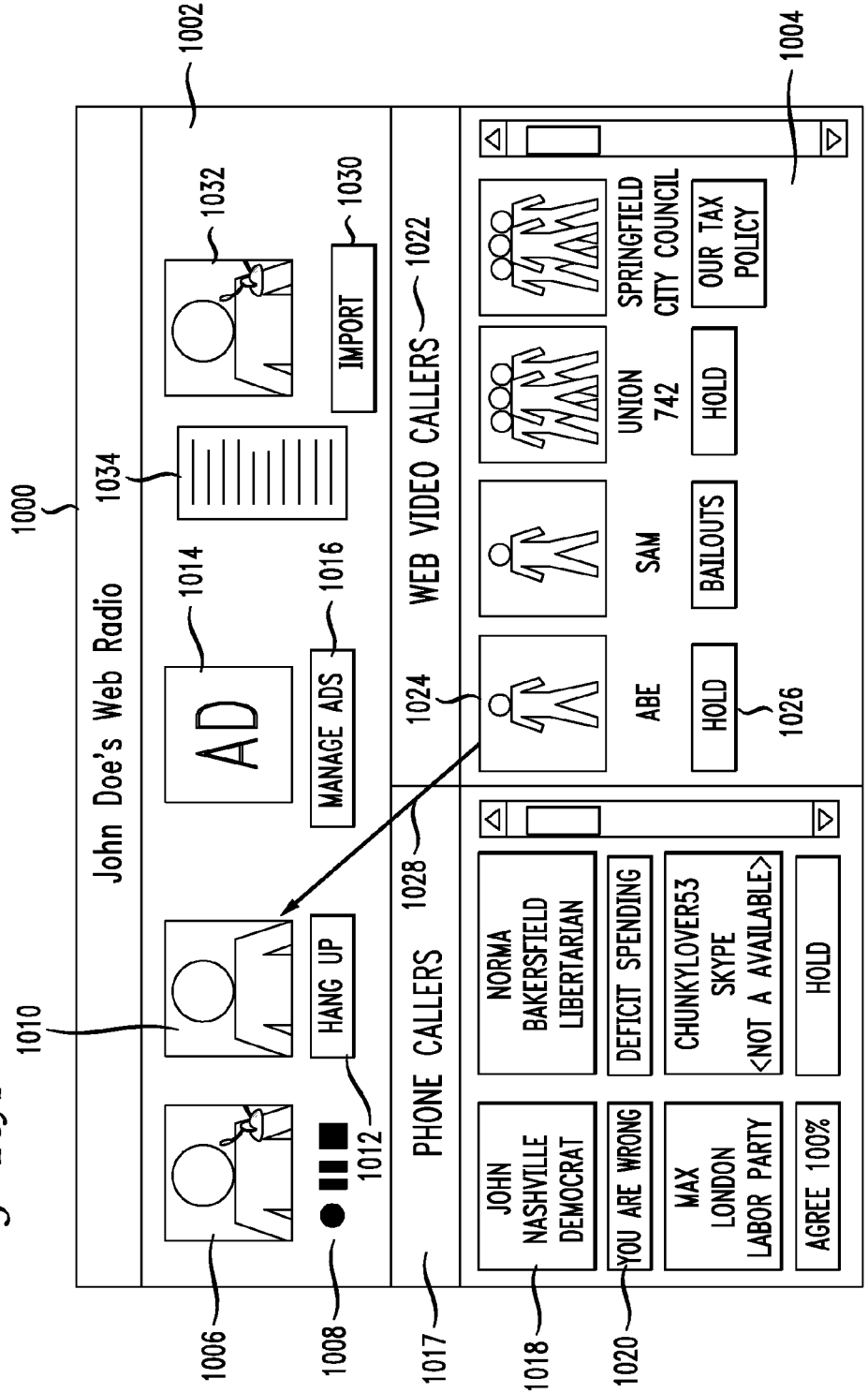
FIG. 10A illustrates an example host interface for controlling a personal radio hosting system.

FIG. 10A illustrates a user interface 1000 to another embodiment which provides an infrastructure for individual users (i.e. not syndicated radio talk show hosts) to broadcast their own radio show in a simple manner via a computer and a web-based dashboard. While this is one specific embodiment, other configurations of this infrastructure exist and can be adapted as one of skill in the art will readily understand. The user interface 1000 is a dashboard for a personal radio host to include an optional video component into the personal radio program. The interface 1000 includes a broadcast view 1002 displayed to the personal radio host and which reflects what is broadcast as the personal radio program and a host view 1004 displayed to the personal radio host.

In the broadcast view 1002, the interface 1000 can include a video feed of the personal radio host 1006, along with controls 1008 such as record, pause, and stop. The broadcast view 1002 can also include a video feed from a listener 1010 with whom the personal radio host is conversing, along with controls 1012 such as a "hang up", mute, and/or place back on hold button. The broadcast view 1002 can also include an advertisement 1014 and user interface elements providing a way to manage advertisements 1016. The interface 1000 can provide a way for the personal radio host to import 1030 audio or video media to a separate part of the broadcast view. For example, if the personal radio host wishes to discuss a remark of the President of the United States, the personal radio host can import a video clip of the remark. The imported video either appears as a separate box in the broadcast view or temporarily appears in place of the video feed of the personal radio host 1006. As the personal radio host manipulates the broadcast view 1002, the listeners' and/or viewers' view also changes correspondingly.

In the host view 1004, the personal radio host sees a list of users wishing to call in. This exemplary view shows a set of phone callers 1016 on one side and web callers 1022 on the other side. Phone callers do not have a video feed in this example, but if they call in using a smartphone, for example, they may be able to engage and disengage a video feed through an integrated smartphone camera, for example. The interface 1000 displays to the personal radio host a list of phone callers' names 1018 and a current status 1020. In this example, the current status of each is "HOLD", but the current status can include any of a number of other states, such as "AVAILABLE", "AWAY", "FRUSTRATED", custom text entered by a caller, or text output from ASR performed on caller speech. The personal radio host can select a particular caller by clicking on their listing, clicking and dragging a particular caller up to the broadcast view, issuing a voice command, pressing a button, and/or providing any other suitable input. The system 100 move the selected caller's listing from the host view 1004 to the broadcast view 1002 and connect to the audio and/or video feed from that caller. If the personal radio host desires to further clarify what a particular caller's current status means, the personal radio host can engage in a non-broadcasted text and/or speech dialog with them before bringing them onto the live broadcast.

Similarly, the interface 1000 displays to the personal radio host a list of web callers' video thumbnails and names 1024, for example. The web callers can connect through a computer having a webcam and microphone, for example. The interface 1000 can also include a current status 1026 in a similar manner to the phone callers. As shown in the web caller 1022 section, some web callers are more than one individual and can even be organized groups of individuals such as a workers' union or a city council interested in local political issues. The system can update the video thumbnails 1024 periodically or in real time so that a web caller can wave or otherwise gesture to attract the attention of the personal radio host.

When the personal radio host wants to connect a web caller to the broadcast view 1002, the host can click and drag 1028 the desired web caller's video thumbnail to the broadcast view 1002. The system can expand the broadcast view to include one or more additional audio, video, and/or advertising feeds as well as the personal radio host's feed 1006. Both phone callers and web callers can be locally, domestically, or internationally based inasmuch as the core infrastructure is based on the Internet and does not necessarily depend on a particular telephone infrastructure configuration.

The host or broadcast view 1000 can also include feeds to other hosts. For example, the host view 1000 can include an audio and/or video feed 1032 of one or more other hosts. The host view 100 can also include a real-time transcription 1034 of what the other host is talking about so that the host can quickly determine what the other host is saying. The host can click the import button 1030 to import stored media as well as to request to import the other host's live show. When the host clicks the import button 1030, the system sends a request to merge the shows. For example, the system can present a live or previously recorded textual or spoken request to the other host saying "Hi, this is John Doe of johndoe.audionow.com. Can we join your show for a few minutes?" The other host can accept or deny the request and can optionally provide a message. For example, the other host can say or type "Sure. We're talking about the first amendment controversy." The audio/web system 916 handles all the logistics of connecting the two hosts and their respective callers into a combined broadcast until one of the hosts breaks back into their own broadcast.

The audio/web system 916 can provide to each host a list of the callers on hold for both hosts during the combined broadcast. The hosts can decide how and what to share with the other host. For example, one host can choose to share full access to their callers on hold with the other host, meaning that the other host can invite them on, discuss with them, and see what they are saying in the previews 1020. Audio-only callers do not notice any change other than additional voices speaking in the broadcast. Web callers can see not only the host and guests (if any) with which they are associated, but also the other host and his or her guests (if any). The audio/web system 916 can apply this approach to more than two hosts' broadcast shows at the same time.

The system can record all broadcasts for a particular host and provide an online history of recorded shows for listeners to browse and/or download. The host can manage the history of recorded shows and set a price for distribution or distribute them free. The histories can include audio, video, and/or text.

In one aspect, the interface 1000 also allows the personal radio host to enter search terms and/or filter criteria to winnow the list of callers to a particular subset of callers in which the personal radio host is interested. The interface 1000 can sort the callers in a number of ways. In one aspect, the interface 1000 sorts the callers in "first in, first out" order. In another aspect, the personal radio host tags certain callers as favorites and the interface places the favorite callers at the top of the list if they are available.

Individuals can use this personal radio host approach to compete with nationwide talk radio hosts, such as Rush Limbaugh or Sean Hannity. The personal radio host approach augmented with video can provide individuals with a way to provide live commentary on sporting events. The principles herein have numerous potential applications and should not be limited to the examples disclosed herein.

FIG. 10B illustrates an example listener interface 1050 for participating in a personal radio broadcast. This listener interface 1050 corresponds to the host interface 1000 shown in FIG. 10A. The listener interface 1050, if on a video-enabled device, shows the video feed 1052 of the personal radio broadcaster and controls 1054 for playing, pausing, and stopping playback. The listener interface 1050 can include a button 1056 to add a recording of the live personal radio broadcast to an audio playlist for later retrieval. The listener interface 1050 can also provide buttons to "go live" after a pause 1058, save the audio of the personal radio broadcast 1060 (as an MP3 or OGG file, for example), and save a transcript of the personal radio broadcast 1062. The listener interface 1050 can include a video feed of a caller 1064 the host has invited to speak. listener interface 1050 can include a clickable link 1066 to request a call to the host and/or information about how to call in to the host. The listener interface 1050 can also include advertisements 1068. The host or the audio/web system 916 can select the advertisements displayed to each listener. The broadcast can include audible advertisements in addition to the graphically displayed advertisements.

In the broadcast view listener interface 1050, the listener can select a type of broadcast encoding, such as Real Media, WMV, QuickTime, 3GP, MPG, FLV, and so forth. Further, the listener interface 1050 can provide a way for listeners to maintain continuity between devices, i.e. transfer the broadcast feed between devices. For example, if the listener is watching the broadcast on a VoIP-enabled personal computer and must leave the computer to drive to work, the listener can provide input through the listener interface to transfer the broadcast feed from the VoIP broadcast to a cellular telephone broadcast and continue listening uninterrupted.

FIG. 11 illustrates an example web interface 1100 for adding text to an audio playlist. An audio playlist allows a user to call a predetermined phone number or receive a call at a specific phone number (such as a cellular, home, or office phone) and listen to passages of spoken text in a queue. For example, a user can call a phone number associated with an audio playlist account and listen to one or more of the passages of spoken text in the queue and navigate through them. The audio playlist system, such as the Audio/web system 916 shown in FIG. 9, can remove playlist items after they are played back or the user can opt to keep certain items in the queue after playback. In another variation, the audio playlist system calls the user's phone number at a predetermined time and prompts the user to indicate whether the user wants to start playback at that time. If the user response is affirmative, the system begins playback. If the user response is negative, the system can then reschedule a time to call the user, change the callback number, delete the article, or otherwise act on the initial and/or additional user response. The system can provide an audio playlist interface to manage the contents and order of the playlist over the telephone or through a web site, for example.

In one aspect, a web site operator publishes a news article, blog post, or other textual information 1102, including a set of icons 1104 representing different established actions. Some such exemplary icons 1104 include StumbleUpon, Facebook, Twitter, and RSS feed. One of the icons 1106 represents a way to add the published text 1102 to an audio playlist for instant, scheduled, and/or on-demand playback via text-to-speech (TTS). In one aspect, where the published text 1102 was transcribed from an audio or video feed, the icon 1106 represents a way to add the source audio from which the published text was generated.

When a user clicks on the icon 1106, the web browser (via JavaScript, HTML5, Flash, and/or other approaches) or other software can provide a popup window 1108 with an interface to add the published text 1102 to an audio playlist. The audio playlist can be a single body of text or multiple bodies of text from multiple sources. For example, the popup window 1108 can include a number to call 1110 to hear the published text. Then the user can call that number 1110 at his or her leisure to hear audio playback of the published text 1102. In another approach, the user can enter his or her own phone number 1112, a desired time 1114 to receive a phone call of the audio of the published text 1102, and a desired language 1116. Then the system 100 can translate the published text 1102 to the desired language 1116 and output a TTS voice in the desired language 1116. The system 100 then calls the entered phone number 1112 at the desired time 1114 and plays back the audio of the published text 1102. In one aspect, the system 100 also accepts audio, touchtone, or other inputs from the user controlling the playback, such as changing the playback rate or volume, changing the TTS voice, pausing, stopping, skipping forward or backward, and so forth.

In one aspect, the user has an account with an audio playlist website. The user can then queue the published text 1102 in an audio playlist, as shown in the "add to playlist" button 1118. The user can also include in the playlist comments 1120 discussing the published text 1102. The popup can include a button 1122 to show the playlist. The user can then manage the playlist via a web interface, directly within the popup 1108, as shown in FIG. 12, or a telephone interface. In the case of a telephone interface, the audio playlist system can call the user's account phone number and provide a speech interface to manage the audio playlist.

FIG. 12 illustrates an example graphical user interface 1200 for managing an audio playlist. For each item queued in the playlist, the interface shows a title 1202 and a source 1204. The system can automatically extract the title 1202 from the published text 1102 or the user can provide a title. The interface 1200 can show additional information such as a timestamp indicating when the item was added to the playlist, the author of the published text 1102, and so forth. The interface 1200 can allow a user to click and drag or otherwise move queued items up and down in the queue. The interface 1200 can provide a mechanism to delete 1206 items from the queue. An audio playlist system can detect whether queued items have updates such as revised text or additional comments that were not present when the item was queued. The interface 1200 can automatically provide an indication 1208 that the content is updated or present the user with the option to update the content. The playlist management interface 1200 can also allow the user to view and edit the phone number 1112, time 1114, and language 1116 options entered as shown in FIG. 11.

Figure 13:
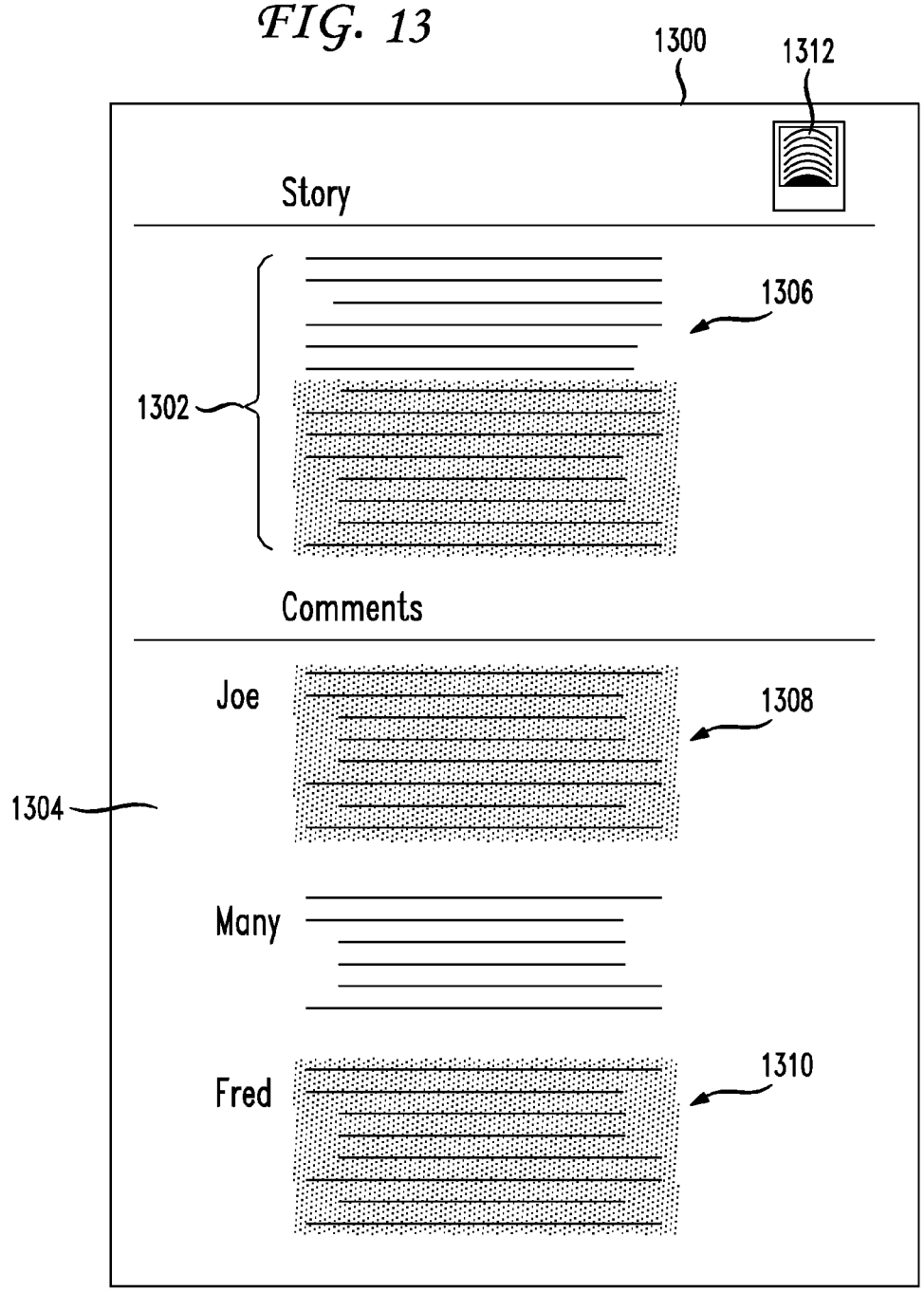
FIG. 13 illustrates an example user interface for selecting specific text objects on a web page for adding to an audio playlist.

FIG. 13 illustrates an example user interface 1300 for selecting specific text objects on a web page for adding to an audio playlist. In this example, a user views in a web browser a web page having published text 1302 such as a news article and user comments 1304. The user can then highlight with a mouse or other user input device a desired portion 1306 of the published text 1302, and desired comments 1308, 1310 to add to an audio playlist. The user can click an audio playlist icon 1312 before or after highlighting the desired portions of text to add the highlighted portions to the audio playlist. The web page can provide a popup, such as the popup 1108 shown in FIG. 11, to add the selected portions to the audio playlist.

When a user clicks on the audio playlist icon 1312, the system can provide the user with a way to share the article with others audibly via a telephone number. For example, if the user has a friend traveling on a business trip, the user can click the icon, enter the friend's phone number and add a text or audio note. The system can play back the note at the beginning before the shared article. The note can introduce, explain, or otherwise describe the article. The system calls the friend's phone number and plays via TTS or a previously-recorded digital audio recording of the user's note, gives the friend an option to listen to the shared article (i.e. via an automatic TTS that says "press or say 1 to listen") and then presents the article to the friend via TTS or recorded audio associated with the article, if it is available. For example, certain articles may be derived from an audio recording of a talk show. From the receiving perspective, the friend receives a phone call with an audio note from the user saying something like "Hey I just saw this article—you need to listen to it . . . " and the friend has the option to listen now, be called back later (like in 10 minutes or at a specific time) with the article, receive an email including an MP3 of the audio, etc.

In order to better facilitate this approach, publishers of online articles can arrange for someone (such as the article author, celebrity, news reporter, voice actors, volunteers, etc.) to read the article aloud and store that audio as an audio file. In this way, when a user chooses to listen to or share an article audibly, the audio is cleaner and more natural than a TTS voice. In one approach, the online publisher generates article audio for the most popular or most commonly shared articles. In one aspect, the articles can include audio, including audio which is not necessarily exclusively spoken words, from online videos from YouTube or from CNN.com.

Embodiments within the scope of the disclosure may also include tangible, non-transitory computer-readable media for carrying or having computer-executable instructions or data structures stored thereon. Such computer-readable media can be any available media that can be accessed by a general purpose or special purpose computer, including the functional design of any special purpose processor as discussed above. By way of example, and not limitation, such tangible computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection to a computer, the computer properly views the connection as a computer-readable medium. Thus, any such connection is properly termed a tangible computer-readable medium. Tangible computer-readable media exclude wireless signals or electromagnetic signals per se. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, data structures, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosed principles may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the herein described embodiments are part of the scope of this disclosure. For example, an alternative system can enable users to receive audio through an audio network that differs from a telephone network. The audio network may communicate with the audio player on a website through messaging applications like Skype, MSN or Yahoo messenger which can be modified or programmed to provide audio. In another example, interactive audio broadcasts which allow for two-way communication are also within the scope of this disclosure.

We claim:

1. A method of communicating information, the method comprising:
    receiving a request by a user from a device for audio from a website, the audio comprising a live program broadcast for multiple users and available for streaming to a browser from the website to yield a received request;
    in response to the received request, connecting the device to the website to yield a connection;
    streaming the live program broadcast from the website to the device;
    receiving, automatically and without input from the user during the live program broadcast via the device, data comprising individual interests of the user;
    aggregating the data with other data from other users to yield aggregated data;
    presenting the aggregated data to a program host, wherein the program host provides live comments during the live program broadcast to the multiple users and wherein the live program broadcast comprises at least in part audio imported from another host's live show; and
    receiving a selection of a selected user by the program host to contact as part of the live program broadcast.

2. The method of claim 1, wherein the received request is a telephone call from the device to an audio system that connects the device with the website that streams audio.

3. The method of claim 1, wherein the selection the user occurs via a web-based selection by the program host.

4. The method of claim 1, wherein individual users also indicate their willingness to be selected by the program host and wherein only those who so indicate have their information presented to the program host.

5. The method of claim 1, wherein the program host streams live audio via a website.

6. The method of claim 1, wherein presenting the aggregated data to the program host further comprises presenting a graphical image summarizing the aggregated data.

7. A system for communicating information between a program host and a calling device, the system comprising:
    a processor; and
    a non-transitory computer-readable medium storing instructions which, when executed by the processor, cause the processor to perform operations comprising:
        receiving a request by a user from the calling device for audio from a website, the audio comprising a live program broadcast for multiple users and available for streaming to a browser from the website to yield a received request;
        in response to the received request, connecting the calling device to the website;
        streaming the live program from the website to the calling device;

receiving, automatically and without input from the user during the live program via the calling device, data comprising individual interests of the user;

aggregating the data with other data from other users to yield aggregated data;

presenting the aggregated data to the program host, wherein the program host provides live comments during the live program to the multiple users and wherein the live program broadcast comprises at least in part audio imported from another host's live show; and receiving a selection of a selected user by the program host to contact as part of the live program.

8. The system of claim 7, wherein the request for streaming audio is a telephone call from the calling device to an audio system that connects the calling device with the website that streams audio.

9. A non-transitory computer-readable storage medium storing instructions which, when executed by a computing device, cause the computing device to communicate information between a program host and a calling device according to operations comprising:

receiving a request by a user from the calling device for audio from a website, the audio comprising a live program broadcast for multiple users and available for streaming to a browser from the website to yield a received request;

in response to the received request, connecting the calling device to the website to yield a connection;

streaming the live program from the website to the calling device;

receiving, automatically and without input from the user during the live program via the calling device, data comprising individual interests of the user;

aggregating the data with other data from other users to yield aggregated data;

presenting the aggregated data to the program host, wherein the program host provides live comments during the live program broadcast to the multiple users and wherein the live program broadcast comprises at least in part audio imported from another host's live show; and receiving a selection of a selected user by the program host to contact as part of the live program.

10. The non-transitory computer-readable storage medium of claim 9, wherein the selection of the selected user occurs via a web-based selection by the program host.

* * * * *